C. W. McKIBBEN.
APPARATUS FOR SEPARATING LIQUIDS IN EMULSION.
APPLICATION FILED JULY 26, 1918.
1,304,786.
Patented May 27, 1919.
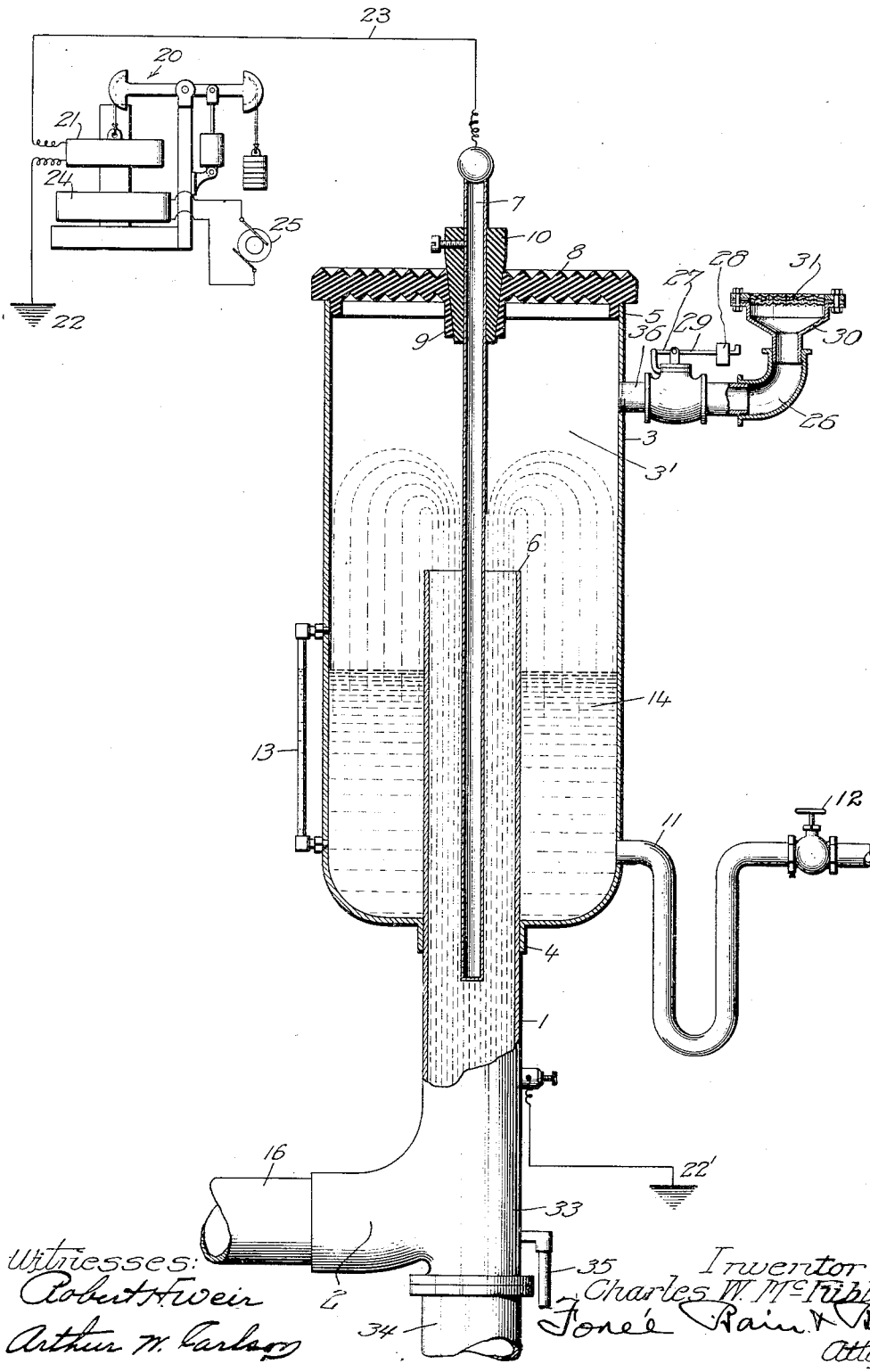

UNITED STATES PATENT OFFICE.

CHARLES W. McKIBBEN, OF HOUSTON, TEXAS.

APPARATUS FOR SEPARATING LIQUIDS IN EMULSION.

1,304,786. Specification of Letters Patent. Patented May 27, 1919.

Application filed July 26, 1918. Serial No. 246,830.

*To all whom it may concern:*

Be it known that I, CHARLES W. McKIBBEN, a citizen of the United States, residing at Houston, in the county of Harris and State of Texas, have invented certain new and useful Improvements in Apparatus for Separating Liquids in Emulsion, of which the following is a specification.

My invention relates to improvements in apparatus for separating one liquid from another, as when said liquids are found in emulsions and has especial reference to means for rapidly and effectually dehydrating petroleum oil emulsions.

One of the specific objects of my invention is to provide a conduit container or treater within which liquids of different specific gravity and differing in specific electrical conductivity may be separated with particular reference to the separation of entrapped water from crude oil, as when these liquids are found in emulsified association.

The apparatus which I am about to describe is especially well adapted for carrying my method of separating water from oil, as disclosed in my copending application, filed January 22, 1918 and identified by Serial Number 213,236, into effect. In this method of procedure, the globules of water, confined in the oil, are polarized by passing the liquids or emulsions through a very intense electric field of relatively long, narrow dimensions, at a velocity that is sufficient only to permit nascent formation of chains of globules of entrapped water. The stress due to the rapid movement of the water and the attenuation of the oil filaments surrounding the globules, due to the polar stress, coöperating to break asunder the oil filaments to free the water and permit coalescence of the smaller globules into larger bodies of free water, preventing the formation of developed short-circuiting chains between the electrodes and across the electric field.

In my copending application for an apparatus for separating liquids, filed June 24, 1917, and identified by Serial No. 203,695, I have shown an apparatus very similar to that disclosed in the drawings of the present application. In the former application, however, the claims presented in the case were of such a character that specific claims for the other features of the invention were not permissible and therefore in this present application the claim is addressed to different features of the apparatus disclosed in the prior application.

In the accompanying drawings, the device shown is an apparatus for treating emulsions as they are rapidly moved through the apparatus. It consists of a vertically disposed metal pipe or conduit 1, of relatively small diameter, and of considerable length, preferably curved at its lower end, as at 2, so that the liquid entering it will not be impeded in its movement to so great an extent as if a sharper angle were employed. The upper end of the conduit 1 is axially open and projects into a relatively large casing 3, closed at its bottom around the conduit 1, as at 4. The upper end of the casing 3, as at 5, is located some distance from the upper end of the conduit 1, as at 6, for a reason to be hereinafter more fully disclosed. A central conductor 7 may consist of a gas pipe of suitable dimensions—I have found a pipe about six inches in diameter admirably suitable for the purpose—is suspended in an insulating cover support 8, which rests upon the edge of the casing 3, as at 5, and is provided with a central boss 9, which has, preferably, a tapered opening for a split plug 10. The central conductor 7 may extend to any distance within the conduit 1, depending upon the rapidity with which the fluid moves through the conduit; the strength of the current and the character of the emulsion that is being treated. The arrangement is such that the central conductor 7 may be raised or lowered in the conduit 1, to vary the contact resistance between the central conductor and the inner wall of the conduit 1, to correspond with the required amount of current needed for the purpose.

Near the bottom of the casing 3, is a trap 11, provided with a valve 12. The object of the trap is to prevent the entrance of air or oxygen into the casing 3, which tends to produce an explosion when an arc is formed between the conductors or electrodes 6 and 7. A water glass 13 is preferably placed in one side of the casing 3 to show the altitude of the liquid within the casing. It is very desirable, in the practical operation of my device, that the liquid line 14 be maintained some distance below the upper end 6 of the conduit 1. The valve 12 is one means for regulating the altitude of the liquid line 14, as it may be opened or closed, depending upon the pressure exerted upon the liquids passing through the central conduit. If the discharge of the materials through the pipe 11 is faster than it comes in through the pipe 16, then the line 14 will gradually fall, but if the liquid, coming through the pipe 16, is greater in volume than that which flows out through the pipe 11, then the line 14 will rise. It is desirable to maintain it at a constant altitude.

The closure 8 is preferably provided with annular sharp projections to break up the film of moisture to prevent short circuiting between the central conductor 7 and the casing 3.

Near the top of the casing 3 and communicating with the vapor space 3′ I prefer to insert a pipe 26 and in the pipe I place a safety valve 27 adjustable by a weight 28 along a pivoted arm 29 to open at a predetermined pressure within the casing 3. On the outer end of the pipe 26 I place an open casing 30 having its large end covered with one or more perforate diaphragms 31, which provides a vent for the chamber 3′ when pressure therein is undesirably increased.

The gases within the chamber 3′ are sometimes ignited by an arc produced by the treating current, thus causing rapid expansion and greatly increasing the pressure within the treater. Upon such occasion, the safety valve 27 will automatically open and allow some of the gases and products of combustion to escape through the vent head 30. The foraminated diaphragms 31 will however prevent the flame from being projected outside of the treater. The oxygen within the treater is therefore quickly consumed and the flame extinguished, whereupon the pressure being reduced, the safety valve 27 will automatically close.

I have shown a connection 33 at the bottom curved end of the treater 1, to which may be connected a settling chamber comprising a relatively long pipe 34 to contain the entrained water that may settle therein by effect of gravity as the emulsion is being treated in the pipe 1. A water glass 35 is a means for indicating the quantity of water and emulsion in the settling pipe 34 and means may be provided for drawing the water off.

I have shown an alternating, substantially constant current transformer 20, having a secondary coil 21 connected to the ground, as at 22, and the other end connected to the central conductor 7, by a wire 23. This coil is automatically moved vertically, with respect to the primary coil 24, which is directly connected to the alternating dynamo 25 and which is relatively stationary. This form of transformer is well known in the art and is a means by which the current passing through the treater, may be prevented from increasing to a dangerous extent and furthermore it is a means by which current may be maintained at substantially constant value under all conditions of operation of the treater.

When the emulsion is passed through the pipe 16 into the vertical pipe or conduit 1, it moves with considerable velocity and the joint effect of the rapidly moving liquid with the polarizing effect of the current, through the electric field of which the oil is rapidly passed, and which exists between the inner surface of the conduit 1 and the outer surface of the conductor 7, the liberation of the globules of water takes place almost as soon as the emulsion enters the electrical field.

Ebullition of gases or steam generated by the heating effect of the current, tends to cause the liquid to spray with considerable force from the upper end 6 of the conduit 1. Now if the upper end of the conduit is too close to the support 8, by the means of which the central conductor is held in place, the spray from the outcoming oil and water will be deposited upon the inner surface of the closure support 8 and cause short-circuit from the central conductor 7 to the outer surface of the casing 3, by the salt in the water that has been separated from the oil in emulsion. It is very desirable, and in fact, essential, that the oil and water should leave the conduit instantly at the time when it reaches the opening at the end 6, so as not to be held or entrapped therein to form eddies and it is furthermore desirable that it should move away from the opening of the conduit 6 to some distance, as for instance to the level 14, so that after the separation between the oil and entrapped water has been once accomplished, the separated liquids are quickly moved entirely out of the field through which they passed during this transformation.

I have found, from empirical investigation, that the rapidity of the fluid moving through the treater pipe 1, together with the ebullition produced by the evolution of steam or other gases effected by the operation of the electric current, tends to cause considerable bombardment of sprayed particles of water and oil in a vertical direction beyond the end of the pipe and for this reason, to prevent it from settling on and condensing upon the surfaces of the support 8, I have removed the support sufficiently away from the end 6 of the conduit so that the support will remain relatively dry.

It is of course not essential that the casing 3 should be present in the structure, in order that the treater may perform the desired functions intended, because the oil leaving the end 6, could be permitted to pass rapidly through the central conduit 1 and fall upon the surrounding earth surface or be caught and held by other means than the casing 3 as shown. I have, however, found this to be a convenient structure and well adaptable for the purpose intended. To put an elbow on the upper end 6 of the conduit 1, and to permit the oil to pass through the elbow in a lateral direction would not so well accomplish the purpose intended to be effected by the structure disclosed in the drawing.

While I have herein shown and described a single embodiment of my invention, for the purpose of clear disclosure, it is manifest that some changes may be made in the general arrangement and disposition of the parts within the scope of the appended claim.

Having described my invention, what I claim is:—

A treater comprising a vertically disposed pipe having its upper end freely open within a surrounding casing; a concentrically disposed casing closed at its upper end and having its lower end contracted and closed by said pipe; a vertically adjustable electrode in said pipe and casing; a valve to divide the chamber therein into a liquid chamber and a gas chamber and a pressure responsive valve communicating with the gas chamber to vent it when pressure therein reaches a predetermined point.

In testimony whereof I hereunto subscribe my name.

CHARLES W. McKIBBEN.